D. E. GRAY AND F. E. BARDROF.
METHOD AND APPARATUS FOR MARVERING GLASS.
APPLICATION FILED OCT. 25, 1920.

1,410,803.

Patented Mar. 28, 1922.
5 SHEETS—SHEET 2.

Inventors
David E. Gray and
Frank E. Bardrof,
By Horsey Cole.
Attorney

D. E. GRAY AND F. E. BARDROF.
METHOD AND APPARATUS FOR MARVERING GLASS.
APPLICATION FILED OCT. 25, 1920.
1,410,803.
Patented Mar. 28, 1922.
5 SHEETS—SHEET 3.
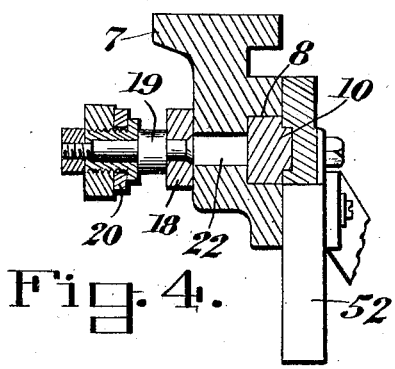
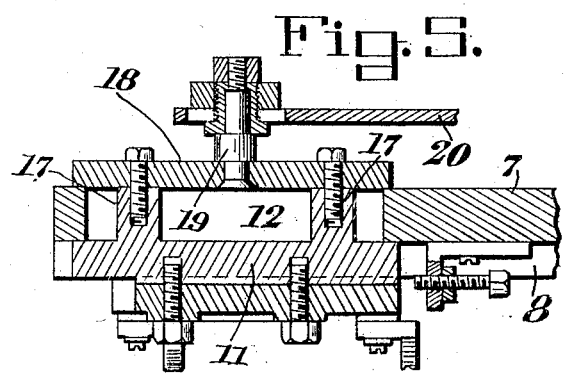
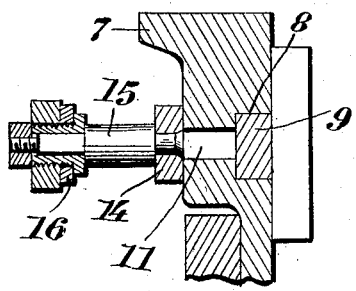
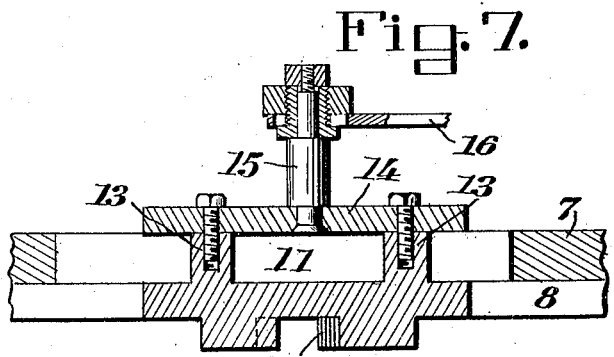
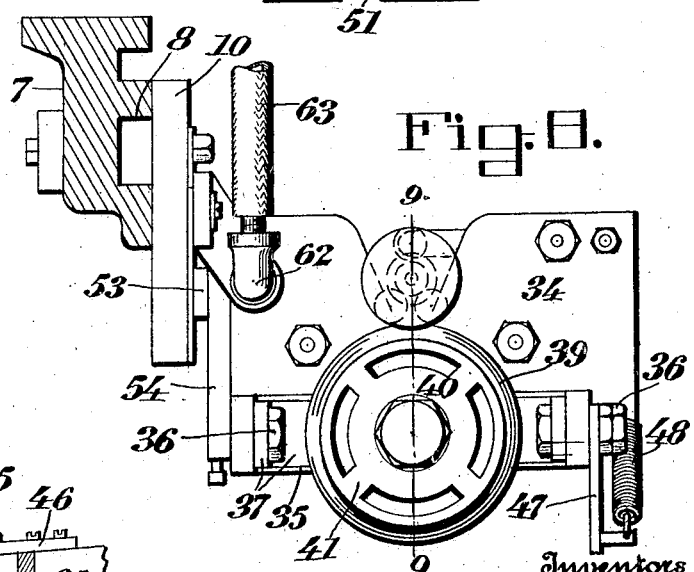
Inventors
David E. Gray and
Frank E. Bardrof,
By Horsey & Cole,
Attorney

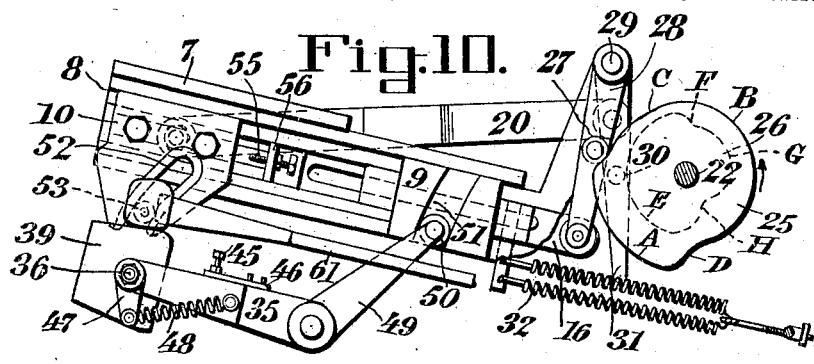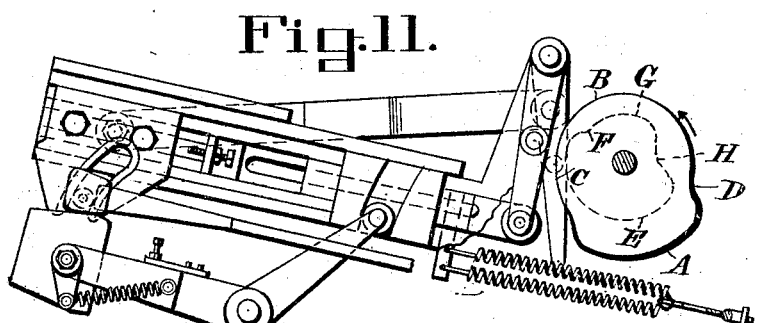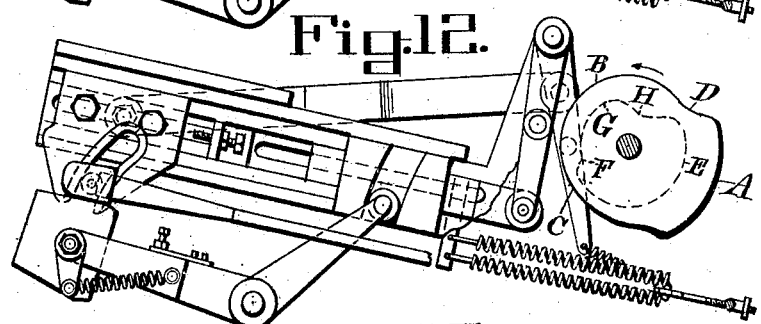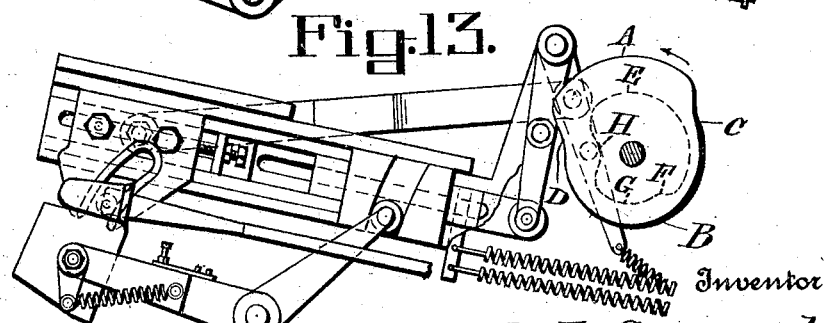

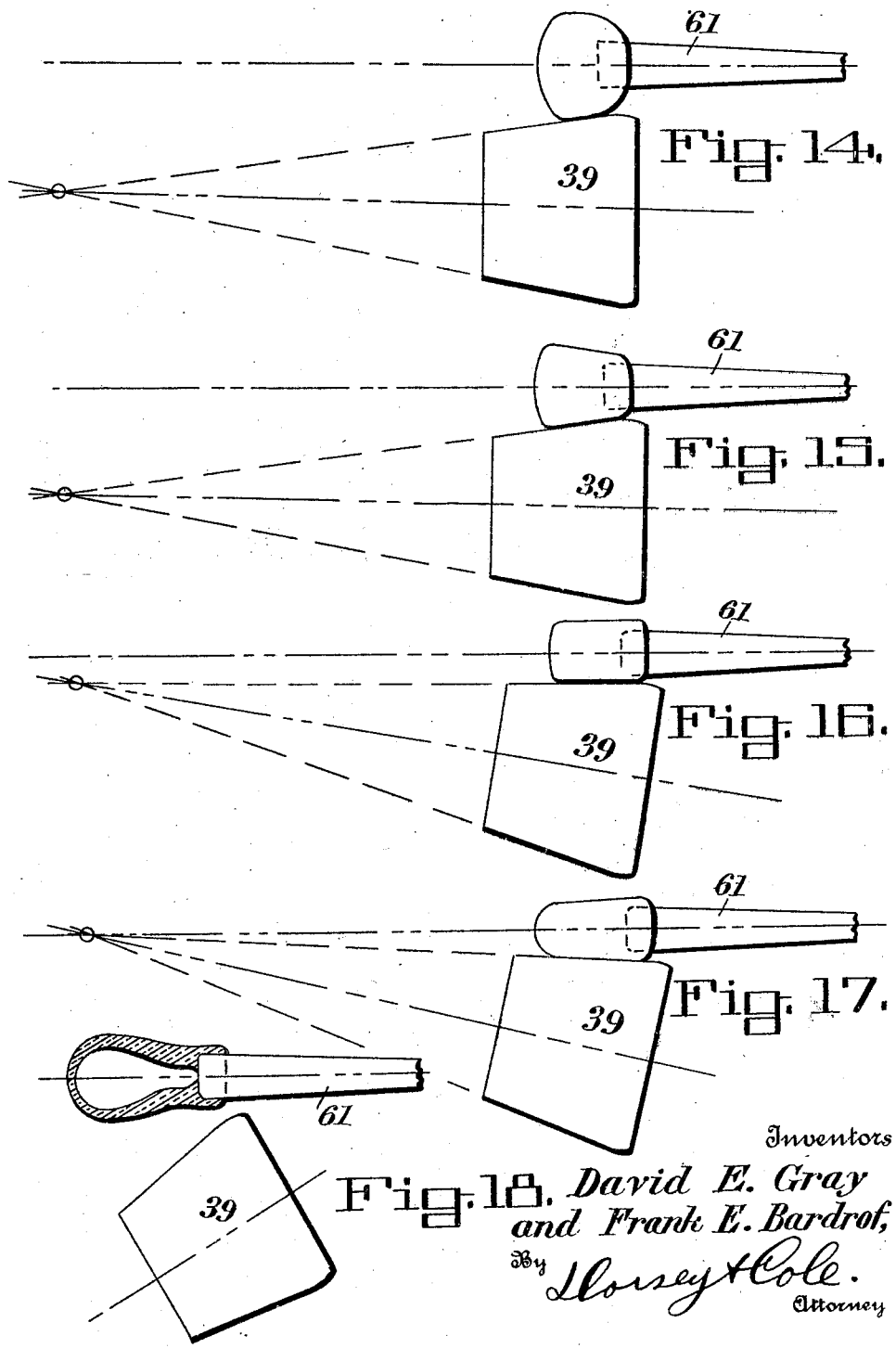

UNITED STATES PATENT OFFICE.

DAVID E. GRAY AND FRANK E. BARDROF, OF CORNING, NEW YORK, ASSIGNORS TO CORNING GLASS WORKS, OF CORNING, NEW YORK, A CORPORATION OF NEW YORK.

METHOD AND APPARATUS FOR MARVERING GLASS.

1,410,803.

Specification of Letters Patent.   Patented Mar. 28, 1922.

Application filed October 25, 1920. Serial No. 419,440.

*To all whom it may concern:*

Be it known that we, DAVID E. GRAY, a citizen of the United States, and a resident of Corning, in the county of Steuben and State of New York, and FRANK E. BARDROF, a citizen of the United States, and a resident of Corning, in the county of Steuben, and State of New York, have jointly invented certain new and useful Improvements in Methods and Apparatus for Marvering Glass, of which the following is a specification.

This invention has for its object to provide a method of, and apparatus for, marvering gathers of glass preliminary to the blowing operations thereon.

It has heretofore been proposed to accomplish this by bringing into contact with a ball of solid glass rotating around its axis, a marverer whose contacting surface progressively approaches the axis of the glass. In one prior machine the marverer consisted of a driven member having a conoidal surface on which the marvering takes place, such surface being at the end of the marvering operation substantially parallel with the axis of the blow-pipe, whereby the gather will be worked into a substantially cylindrical blank. In another instance it has been proposed to move and hold a flat marvering plate against the glass while the glass is rolled along the surface of the plate. Again it has been proposed to make the marverer in the form of a flattened conoid, positively rotated about an axis at right angles to the longitudinal axis of the blow-pipe during the marvering, the construction being such that the tip of the marvered blank is worked on that portion of the cone of the greatest circumference (i. e., on the base of the cone).

In the device herein described the marverer consists of a roller, mounted on bearings, and revolved by the driving action of the glass when such glass is in contact with the marverer, the marvering roller being mounted for movement toward the axis of the glass under the influence of spring pressure, and being mounted for a tilting action, under spring pressure, in respect to such axis, around a pivot intermediate of the length of the surface to be marvered. The surface of the roller is of conoidal form with its apex when the marvering operation is completed in the prolongation of the axis of the glass, so that the finished blank is a conoid.

With this construction, laps in the blank due to slip between the surface of the glass and of the marvering roller are reduced, as the final working of the blank is performed on a circular body whose diameter at every point has a practically uniform ratio to the diameter of the finished blank at such points. The pressure between the blank and the marverer is entirely due to spring action, which tends to keep the blank concentric with a glass carrying spindle and to keep a uniform contact between the glass and the marvering roller.

The invention further consists in the construction, arrangement and combination of the parts of which it is composed, and in the method embodied therein, as will be hereinafter described and claimed.

To enable others skilled in the art to which this invention appertains to practice the process and construct and use the apparatus, reference should be had to the detailed description hereinafter given and to the accompanying drawings, in which:

Figure 4, is a cross-section, taken through the structure shown in Fig. 3, illustrating the detailed construction of the roller tilting slide;

Figure 5, is a horizontal section taken through the parts shown in Fig. 4;

Figure 6, is a cross-section, taken through the structure shown in Fig. 2, illustrating the detail construction of the roller swinging slide;

Figure 7, is a horizontal section, taken through the parts shown in Fig. 6;

Figure 8, is an end elevation, showing the marvering roller and its supporting frame, illustrating their relative position to the tilting slide and the blank chilling means;

Figure 9, is a section through the roller, taken on the line 9—9 of Fig. 8;

Figure 1:
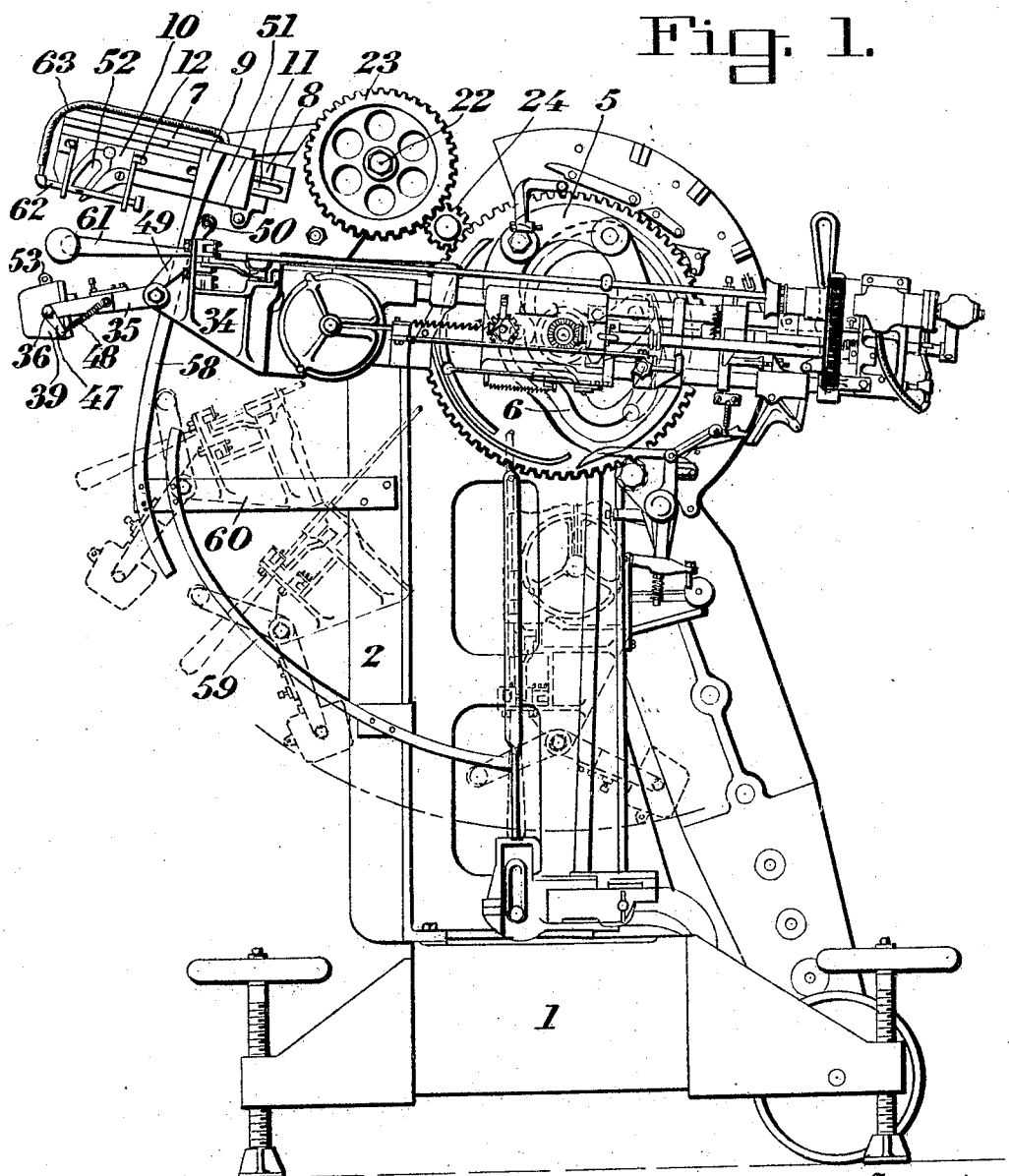
Figure 1, is an elevation of a glass-working machine showing this invention applied thereto, the parts being in the normal or blow-pipe loading position.

Figures 10, to 13, inclusive, are fragmentary elevations of a portion of the machine, showing the manner in which the glass is shaped upon a blow-iron, parts being omitted for clearness in illustration;

Figures 14 to 17, inclusive, are diagrammatic views showing a gather of glass upon the end of a blow-pipe, and the manner in which the blank is shaped by the marvering roller, and Figure 18, is a similar view, showing the shape of the blank immediately after the marvering roller is removed therefrom and after it is given the first puff of air.

In the machine in association with which we have shown the subject matter of this application there is by preference a vertical webbed standard 2, arising from a trough-shaped base 1. In the standard near the top thereof is mounted a cam disk 5, having peripheral teeth, and driven intermittently from a main drive shaft 3, the construction being such that the disk will be driven through a certain angular movement, then arrested and then again put in movement to complete its full rotation, for each article produced.

A blow frame of skeleton construction, adapted to receive and hold a removable blow-pipe or glass-carrying spindle is mounted on the standard 2 in front of the disk 5, to oscillate in a vertical plane around an axis concentric to that of the rotation of the disk, and the disk is provided with a cam run 6 in its forward face which through suitable mechanism serves to oscillate the blow-pipe frame. The cam run 6 is so shaped that when the parts are in normal position the blow-pipe frame is nearly horizontal and that it will during the movement of the cam disk first be swung in the direction reverse to that of the movement of the disk; after a rest will then be reversed in its movement and be swung in the direction of the movement of the disk until vertical and will during further movement of the disk be temporarily held in its vertical position; and will then on further rotation of the disk be given a movement reverse to that of the rotation of the disk and returned to normal position. Some functions accomplished by these several movements of the blow-pipe frame will be hereinafter described. For the present it is sufficient to state that the initial movement of the blow-pipe frame in the direction reverse to that of the movement of the disk rises to the lower end (that is to say that end upon which is the gather of glass) of the blow-pipe slightly above the position it occupied in the normal position of the blow-pipe frame, and positions the blow-pipe for the marvering; that the next movement of the blow-pipe, (which is in the same direction as the rotation of the disk) causes the introduction of blow-out air into the blank and places the blow-pipe in a vertical position with the blank thereon in proper relation to the mold for blowing, that the temporary arrest of motion of the blow-pipe frame permits the elongation of the gather, and that the subsequent movement of the blow-pipe frame in the direction reverse to that of the rotation, of the disk restores it to its normal position. These movements and the rest at marvering are all due to the rotation of the cam disk and are functions of the rotation of that wheel.

Details of the construction and arrangement of the several parts above referred to are shown in United States Patent No. 1,124,702; dated Jan. 12, 1915.

The upper end of the webbed standard 2 carries on its left hand side a projecting arm 7, such arm being in the rear of the corresponding blow-pipe frame, the axis of the arm being at an angle above the horizontal, and serving to support the mechanism which controls the movement of the marverer towards and from the gather. The marverer itself, instead of being mounted on this arm, as in the aforesaid patent is mounted on the blow-pipe frame, and operative engagement between it and its control mechanism is made when the blow-pipe frame is in marvering position. Thus the pivot of the blow-pipe frame is relieved of the strains which in the previous construction were transmitted therethrough due to the reaction between the glass on the blow-pipe frame and the marvering mounted on the arm.

The projecting arm 1, of the webbed-standard 2, has formed on the front face thereof a channel 8, in which is mounted a pair of slides 9 and 10, in the inner and outer ends of the channel, respectively. The arm 7, is provided with slots 11 and 12, the former receiving bosses 13, projecting from the slide 9. These bosses extend through the arm 7 to the rear thereof, where they are secured to a plate 14, having projecting therefrom a pivot pin 15, to which is connected the forward end of a link 16. The outer slide 10 is also provided with bosses 17, which project through the slot 12, in the arm 7, and are secured to a plate 18, similar to the plate 14, the plate 18 being provided with a pivot pin 19 to which is connected the forward end of a link 20.

Carried by the inner portion of the arm 7, on an upwardly extending portion thereof, is a bearing 21, for a shaft 22, having fixed thereto a gear 23, meshing with an idler gear 24, also carried by the arm 7. The gear 24 meshes with the gearing on the main cam-disk 5, so that the gear 23 is driven by the cam-disk. By preference the number of teeth formed on the gear 23 is half those with which the cam-disk 5 is provided, and when in the operation of the machine the cam-disk makes one revolution, the gear 23 will be revolved twice.

Fixed to the shaft 22, in spaced relation with each other, is a pair of cams 25 and 26, the former being adapted to engage with a roller 27, carried by an arm 28 pivoted to a stud 29, on the arm 7, while the latter is adapted to engage with a roller 30, carried by an arm 31, also pivoted to the stud 29. To the arms 28 and 31 are connected the opposite ends of the links 16 and 20.

Figure 2:
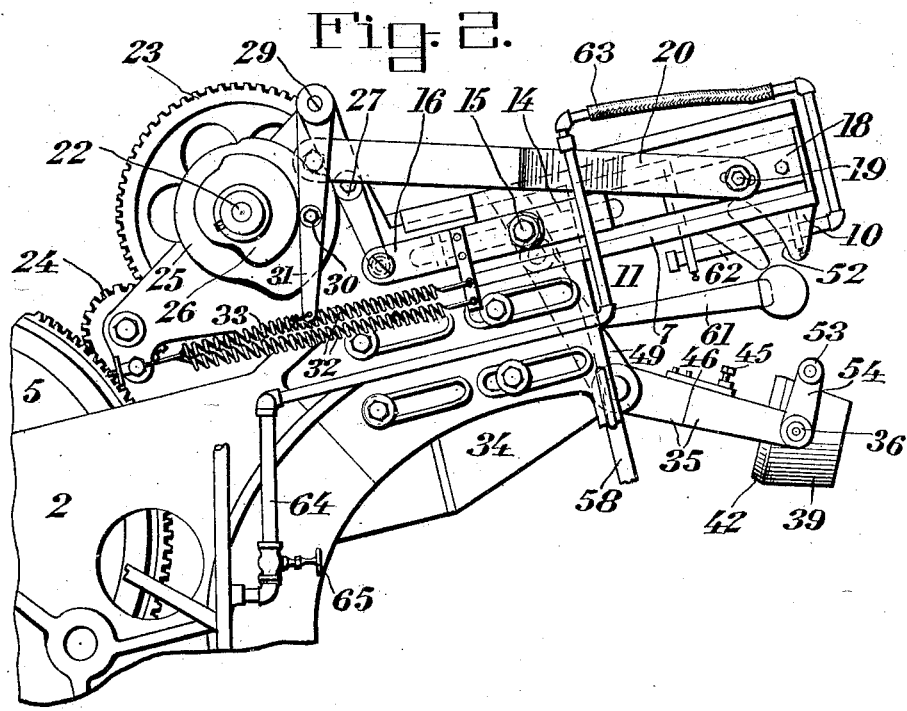
Figure 2, is a view of the upper portion of the machine, looking from the opposite side as that shown by Fig. 1, and illustrating in detail the mechanism for actuating the blank-forming means.
Figure 3:
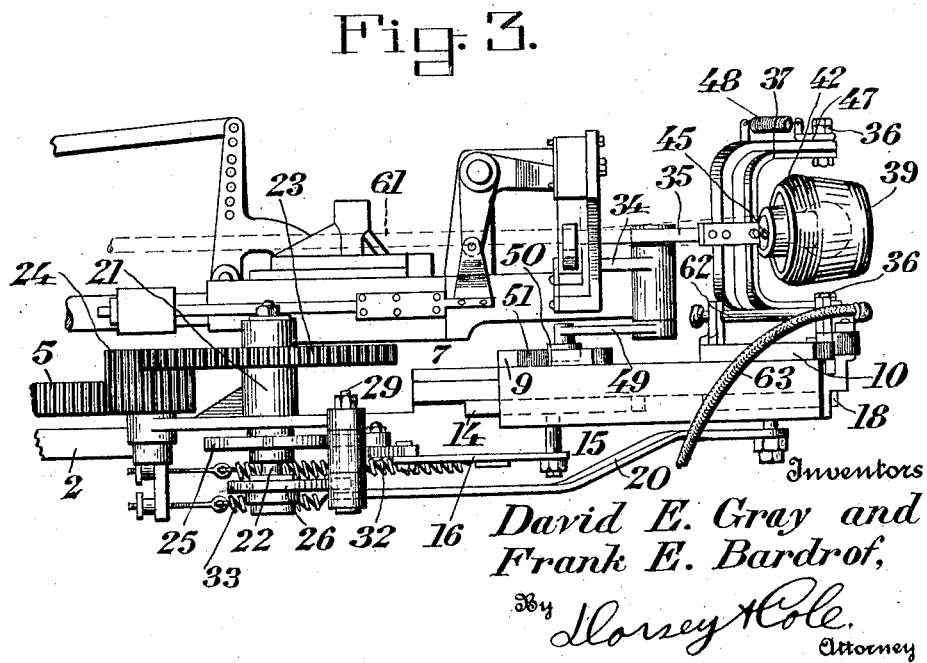
Figure 3, is a plan of the structure shown in Fig. 2.

The cam 25, is provided with two concentric runs A, and B, the former being struck with a greater radius than the latter, and connected by two eccentric runs C and D, the former of which is designed to gradually slide the inner slide 9 outwardly against the pull of contractile springs 32, which are connected to the slide, and are adjustably connected to the arm 7, near the idler gear 24, as shown in Fig. 2.

To the lower end of the arm 31, is also connected a spring 33, which serves to retain the roller 30, carried by the arm in engagement with the cam 26. This cam is provided with a concentric run E, through approximately one-half of its circumference, and during the contact of the roller with this portion of the run of the cam, the outer slide 10 remains stationary in the outward limit of its movement.

The cams are adapted to be revolved in the direction of the arrow (Figure 2).

The normal positions of both slides is outward, and they are held in this position until their actuating cams are revolved through the medium of the gearing between them and the main cam-disk when the latter is set in motion. The relative positions of the cam-runs on the cams 25 and 26, are such that the cam 25 first permits the inner slide 9 to be moved inwardly while the slide 10 is held in its normal or outer position, and that then the slide 10 will be released for inward movement for a predetermined time, at the end of which time both sides will be simultaneously moved outward to their normal positions.

Pivoted in a bearing on the lower end of a bracket 34 on the blow-pipe frame, is an arm 35, which has its outer end bifurcated to receive studs 26, fast to and projecting from the arms of a yoke 37, carrying intermediate of its prongs, a spindle 38 on which is revolvably mounted a marvering roller 39. The roller is preferably formed a frustum of a cone, consisting of an outer shell connected to a central hub 40 by means of a plurality of webs 41, the hub, webs and outer shell being preferably of one piece construction. The outer surface of the roller is finished smooth. The rearward portion 42, of this outer surface, is ground down during the finishing operation thereof, so that no abrupt or sharp shoulder is present at the rear of the roller. The purpose of this will be hereinafter fully described.

Ball bearings 43 are interposed between the spindle 38 and the hub of the marvering roller.

For the purpose of limiting the movement of the roller and yoke around the pivotal point of the latter formed by the studs 36, a set screw 45, carried by a plate 46 on the arm 35, is provided; the set screw contacting with the inner end of the yoke 37. Keyed to one of the studs 36, of the roller yoke 37, is an arm 47, having its free end connected by a spring 48 to the arm 35. The tension exerted by the spring will tend to swing the inner end of the spindle 38 upwardly against the set-screw 45.

The stud-shaft of the arm 35 extends through the bearing and carries on the rear side thereof, a crank arm 49, having a roller 50 at its outer end. Formed in the outer face of the inner slide 9, is an arcuate slot 51, which is designed to receive the roller 50, when the blow-pipe frame is moved upwardly through the medium of the cam-disk 5, as has been previously described. The outer slide 10, is also provided with an arcuate slot 52, which is designed to receive a roller 53, carried by an arm 54, fixed to the adjacent stud 36 of the roller-carrying yoke 37. The purpose of the inner slide 9 is to swing the marvering roller 39 upwardly about the pivot formed by the bearing on the forward end of the bracket 34, and when the marvering roller is thus swung the roller 53 on the arm 54 engages the slot 52, on the outer slide 10. When the outer slide is then moved rearwardly through the action of the cam mechanism previously described, the marvering roller will be tilted on its axis, the inner limit of movement of the inner slide under the pull of the spring 33 being determined by the adjustment of a set-screw 55 on the front face of the bracket 56.

As the roller 39 normally projects beyond the lower end of the blow-pipe frame and beyond the end of the blow-pipe, it is necessary, in order to avoid interference between the roller and the top of the blowing mold to swing the roller and its supporting parts upwardly as the blow-pipe frame assumes its vertical position. For this purpose a fixed cam track formed by strips 58 and 59, is mounted on the machine. The strip 58 has its inner face in alinement with the outer edge of the slot 51, formed in the inner slide 9, and extends downwardly below a bracket 60, projecting outwardly from the web-standard 2, it having its end attached to such bracket. The strip 59, is spaced inwardly a suitable distance from the lower end of the strip 58, its upper end being secured to the bracket 60, while its opposite end is fastened to the standard 2.

The cam-track serves as guiding means for the roller 50, carried by the arm 49 of the arm 35, and as the blow-pipe frame is swung downwardly on its pivot, the arm 35 is swung backwardly upon its pivot to the positions illustrated by dotted lines in Figure 1, thereby lifting the marvering roller 39 to a position where it will not strike or be struck by the blowing mold when the blow-pipe frame moves to or is in its vertical position.

In the operation of the machine, an attendant gathers a suitable amount of molten glass upon the end of a blow-pipe 61, and inserts the latter in its frame, the parts then being in substantially the position shown by Figure 1. The main cam disk 5 is then put in motion. The blow-pipe frame is caused to swing upwardly a few degrees of arc and is arrested in its motion, with the roller 50 in the slot in the inner slide which is at its outer limit of movement. Immediately thereafter, the rotation of the cam 25 permits the springs 32 to pull the slide inwardly, and the marverer is thereby lifted and brought into engagement with the gather of glass, as shown by Fig. 10, which brings the roller 53 into the slot 52 of the outer slide 10. The position of the marvering roller is now independent of the cam (See Fig. 11), and is controlled by the resistance offered by the glass on the blow-pipe to the tension of the spring 32.

As the blow-pipe is in rotation around its longitudinal axis, the marvering roller will be rotated by frictional engagement with the blank thereon. The anti-friction bearings on which the marvering roller is mounted are of value in reducing the slip between the surface of the roller, and of the blank.

Referring now to Figs. 10–13 inclusive, wherein is illustrated the positions assumed by the blank-forming mechanism during the shaping thereof, and especially to Fig. 10, which represents an early stage of the marvering, it will be noticed that the sides of the gather have been slightly flattened, and the gather while of conical shape has its base opposite that end by which it is attached to the blow-pipe. The continued action of the marvering roll on the gather under the pressure created by the spring, reduces the diameter of the blank, without substantial change in its shape (see Figs. 11 and 12). The continued rotation of the cans 25 and 26, permits the spring 33 to move the outer slide 10 inwardly a predetermined amount, and to thus tilt the marvering roller on its transverse bearings formed by the studs 36, this tilting being opposed by the resistance offered by the blank. Figures 12 and 16 show a position assumed in the blank forming process, and as a result of this gradual tilting, the blank being now substantially of cylindrical form. Further movement of the cam 26 will permit the outer slide 10 to be moved inwardly a further distance until it abuts the stop formed by the set-screw 55, and this movement will tilt the roller to the position shown by Fig. 13, whereby the blank is tapered.

It will be noted that the marvering is done on the exterior of a body (i. e., the roller 39) which is circular in cross-section. By reason of this the area and time of contact between the blank and the body is reduced to a minimum, and the heat loses from the body of the gather during the marvering lessened. In order to locally chill the gather a pipe 62 is carried by the outer slide, the pipe having a narrow slit therein, so positioned that it is adjacent the end of the blow-pipe. The pipe 62, is flexibly connected by a hose 63, to an air supply pipe 64 carried by the standard 2, a valve 65 being placed in said pipe so that the amount of the air emitted through the opening in the pipe 62 may be regulated. During the blank forming process, the air, as it leaves the opening in the pipe 62, strikes the mass of glass surrounding the end of the blow-pipe, and rapidly chills it, so that when the blow-pipe, is swung downwardly the glass will elongate uniformly throughout its length.

It will be noticed that, due to the distance between the marvering roller and the bearing in which the arm is carried, the roller in working down the glass approaches the axis of the blow-pipe with but little change in the direction of its own axis of rotation. It will be further noticed that due to the location of the studs 36 which are close to the marvering roller, and are by preference, as shown, located intermediate of the length thereof, any movement of the roller around such studs results in a substantial change in the position of the axis of the roller.

For the purpose of illustrating on a larger scale the preferred positions assumed by the roller 39, during the blank-forming period, these positions are diagrammatically illustrated by Figs. 14 to 17, inclusive. Referring to Fig. 14, it will be noticed that the axis of rotation of the blow-pipe and the roller are substantially parallel when the roller is first brought into contact with the gather of glass, while the face of the roller adjacent to the glass is inclined to the axis of the blow-pipe, intersecting the latter in the rear of the glass. In Fig. 15, the movement of the roller around its pivot and the resultant pressure against the gather has caused the latter to assume a conoidal shape, reversed in position of the roller, while the relative inclination of the axes of the roller and blow-pipe have remained substantially unchanged. Due to the tilting of the roller around the studs 36, which now takes place, as shown by Fig. 16, the face of the roller adjacent to the glass is substantially parallel with the axis of the blow-pipe, and with the form of roller shown, the axes of rotation of the roller and the blow-pipe now intersect at a distance from the gather end of the blow-pipe and beyond the gather thereon, the blank being substantially cylindrical in form and also elongated somewhat from the spherical gather or ball shown by Fig. 14. Further tilting of the roller around the studs 36 will cause the line of the face adjacent to the blow-pipe to intersect (if projected), the axis of the blow-pipe at a point, beyond the gather end, and the axial line of rotation of the blow-pipe, to intersect at a common point, such as is shown by Fig. 17.

By preference, the taper of the marverer roller is such that when the marvering operation is completed, and the glass worked to the shape desired for the blank the apex of the cone of which the roller is a frustrum is located in the line of the longitudinal axis of the blow-pipe. Under these conditions, the relation between the radius of the finished blank at all points along its length and the radius of the marvering roller at corresponding points will be constant so that in the rotation of the latter by the former, points along the periphery of the finished blank will move with the same velocity as the corresponding points along the surface of the marvering roller with which it is contact thus reducing slip.

At the conclusion of the marvering, the rotation of the cams 25 and 26 move the slides 9 and 10 outwardly, removing the marvering roller from the glass, and the blow-pipe then swings downwardly, a puff of air being admitted to give a preliminary expansion to the blank as shown in Fig. 18. During the swinging movement of the blow-pipe frame the marvering roller carrying frame is moved on its bearings by the cam-track formed by the strips 58 and 59, so that when the blow-pipe assumes a vertical position, the marvering roller will have been lifted to clear the mold.

While we have herein shown our invention applied to a glass blowing machine having a blow-pipe, it is to be understood that we are not limited to this application, and that our invention is capable of being used in connection with various types of glass working machines, other than that shown, without departing from the spirit of the appended claims.

Having thus described the invention what is claimed is:—

1. The method of shaping a gather of glass into a blank which consists in forming the glass into a conoidal blank by rotating the same on a conoidal roller, the apex of which is located approximately in the axis of rotation of the finished blank.

2. The method of shaping a gather of glass into a blank which consists in marvering the glass into a conoidal blank by a conoidal roller, and rotating the roller by the rotation of the blank thereon, the apex, of which is located approximately in the axis of rotation of the finished blank.

3. The method of shaping a gather of glass on a blow-pipe which consists in subjecting that part of the glass which projects beyond the end of the pipe to a marvering action, and locally chilling the glass by a blast of air.

4. In a glass-working apparatus, the combination with a revolving glass-carrying spindle, of a rotating conoidal marverer, and means for moving the marverer towards the spindle, and shifting its axis in respect to the axis of the spindle.

5. In a glass-working apparatus, the combination with a revolving glass-carrying spindle, of a conoidal marverer mounted for rotation under the driving effect of the glass on the spindle when in contact therewith, and means for moving the marverer towards the spindle, and shifting its axis in respect to the axis of the spindle.

6. In a glass-marvering apparatus, the combination with a revolving glass-carrying spindle, of a marverer, and resilient means for tilting the marverer during the marvering around a point adjacent to its marvering surface, so that such surface is shifted in its inclination to the longitudinal axis of the glass-carrying spindle.

7. In a glass-working machine, the combination with a revolving glass-carrying spindle, of a marverer pivoted transversely of the axis of the spindle adjacent to its marvering surface, resilient means tending to tilt the marverer in respect to the axis of the spindle, and means for bringing and holding the marverer in contact with the glass.

8. In a glass-working machine, the combination with a revolving glass-carrying spindle, a marverer, resilient means for bringing and holding the marverer in contact with the glass, and resilient means tending to tilt the marverer in respect to the axis of the spindle, around a pivot point adjacent to the marvering surface.

9. In a glass-working apparatus, the combination with a machine frame, of a blow-pipe receiving frame mounted thereon for movement to a marvering position, a marverer carried on the blow-pipe frame, and means for controlling the movements of the marverer mounted on the machine frame normally free from the marverer and brought into operative engagement therewith on the movement of the blow-pipe frame to marvering position.

10. In a glass-working machine, the combination with a glass-carrying spindle, of a marverer mounted for movement towards the spindle and for tilting movement in respect thereto, resilient means tending to so move and tilt the marverer, and means normally restraining the resilient means, but releasing the marverer for movement towards the spindle and for then releasing it for its tilting movement.

11. In a glass-working apparatus, the combination with a glass-carrying spindle, of a pivoted arm, a marverer pivoted in the arm, the pivot of the arm being remote from the marverer, and the pivot of the marverer on the arm being close to the marverer, springs tending to move the marverer on its several pivotal mountings towards the spindle, and to incline it in respect to the axis of the latter, respectively, and means normally restraining the action of the springs but adapted to release the marverer for movement on the remote pivot and on its proximous pivot.

12. In a glass-working apparatus, the combination with a main frame, of a blow-pipe carrying frame mounted for movement in the main frame, a marvering roller mounted for movement on the blow-pipe frame towards the blow-pipe and for a tilting movement in respect thereto, resilient means tending to move the roller, control mechanism on the main frame normally free from the roller, but adapted to be operatively engaged therewith by the movement of the blow-pipe frame, and when put into engagement therewith, adapted to first release the roller for movement towards the blow spindle and for then releasing it for its tilting movement; and means including the blow-pipe for rotating the marvering roller.

13. In a glass marvering apparatus, the combination with a blow-pipe carrying a mass of glass on and beyond one end thereof of a marvering means for bringing the marverer into contact with the sides of glass beyond the end of the blow-pipe, and a pipe discharging air on the glass around the end of the blow-pipe to locally chill it.

14. In a glass working apparatus carrying a body of revolving glass adapted to be formed into a blank, a conoidal marverer, and means for moving the marverer towards the glass and shifting its axis in respect to the axis of the revolving glass.

In testimony whereof we herewith sign our names this 15th day of October 1920.

DAVID E. GRAY.
FRANK E. BARDROF.